United States Patent
Kato et al.

(10) Patent No.: US 7,716,812 B2
(45) Date of Patent: May 18, 2010

(54) METHOD OF MANUFACTURING A MAGNETIC HEAD

(75) Inventors: Atsushi Kato, Kanagawa (JP); Norihiro Ookawa, Kanagawa (JP); Hisashi Kimura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 863 days.

(21) Appl. No.: 11/408,429

(22) Filed: Apr. 20, 2006

(65) Prior Publication Data

US 2006/0238918 A1 Oct. 26, 2006

(30) Foreign Application Priority Data

Apr. 21, 2005 (JP) ............................. 2005-123433

(51) Int. Cl.
*G11B 5/187* (2006.01)

(52) U.S. Cl. .............. 29/603.12; 29/603.13; 29/603.15; 29/603.23; 360/317; 360/125.1; 360/125.14; 360/125.6; 360/125.65

(58) Field of Classification Search .............. 29/603.12, 29/603.13, 603.15, 603.16, 603.18, 603.23, 29/603.25; 360/123.18, 123.24, 125.5, 317, 360/125.1, 125.14, 125.6, 125.65
See application file for complete search history.

(56) References Cited

U.S. PATENT DOCUMENTS 5,590,008 A * 12/1996 Tanabe et al. ............ 360/125.5
6,430,806 B1 * 8/2002 Chen et al. ............ 29/603.15 X
6,466,401 B1 * 10/2002 Hong et al. .............. 360/317 X
6,532,647 B1 * 3/2003 Maekawa et al. ........ 29/603.13
6,757,141 B2 * 6/2004 Santini et al. ................ 360/317
6,801,407 B2 * 10/2004 Sasaki et al. ................. 360/317

FOREIGN PATENT DOCUMENTS

JP          06131631 A  *  5/1994
JP          2003-263705    9/2003
JP          2004-095006    3/2004

* cited by examiner

*Primary Examiner*—A. Dexter Tugbang
(74) *Attorney, Agent, or Firm*—Townsend and Townsend and Crew LLP; Rambod Nader

(57) ABSTRACT

A main magnetic pole of a recording head is formed in an inverted trapezoidal shape by ion milling but, the long milling time poses a problem of variations in the inverted trapezoidal shape and the dimensional variations in track width. In one embodiment of the invention, a recording head is formed by first forming a lower magnetic pole, a gap layer, and conductor coils, forming an upper magnetic yoke over the gap layer at a position recessed from the air bearing surface, and forming an inorganic insulative layer in the recessed portion. A back magnetic pole connected with the upper magnetic yoke is formed on the back of the lower electrode. Successively, the upper surfaces of the inorganic insulative layer and the upper magnetic yoke are planarized, on which an underlayer film such as of Rh is formed. A magnetic layer is formed by stacking a plurality of thin magnetic films by sputtering over the underlayer film from the air bearing surface as far as the position overlapping the upper magnetic yoke. Successively, ion milling is applied to form a main magnetic pole of an inverted trapezoidal shape having a taper on the lateral surface as viewed from the air bearing surface.

12 Claims, 11 Drawing Sheets

(Embodiment)

(a)

(b)

(c)

Disk rotational direction

METHOD OF MANUFACTURING A MAGNETIC HEAD

CROSS-REFERENCES TO RELATED APPLICATIONS

This application claims priority from Japanese Patent Application No. JP2005-123433, filed Apr. 21, 2005, the entire disclosure of which is incorporated herein by reference.

BACKGROUND OF THE INVENTION

The present invention relates to magnetic heads used for reading and writing data from and to a magnetic recording medium and manufacturing methods thereof and, more in particular, it relates to a magnetic head suitable for perpendicular magnetic recording and a manufacturing method thereof.

In magnetic disk apparatus, data on a recording medium is read and written by a magnetic head. To increase the recording capacity per unit area of the magnetic disk, it is necessary to increase the areal density. However, a current longitudinal recording system involves a problem in that the areal density cannot be increased because of thermal fluctuation over the magnetization of the medium as recordable bit length is smaller.

Methods capable of solving the problem include a perpendicular recording system of recording magnetization signals in the direction perpendicular to the medium. The perpendicular recording system can use a giant magnetoresistive head (GMR head), a tunneling magnetoresistive head (TMR head) with further higher reading output, or a CPP (current perpendicular to the plane) type GMR head, which allows a current to flow perpendicularly to the film surface. On the other hand, it is necessary to use a single magnetic pole head for recording. Also in order to increase areal density, the perpendicular recording requires improving the track density and the linear recording density. To increase the linear recording density, it is necessary to improve the gradient of recording magnetic fields of the recording head. For this purpose, the recording medium is constituted as a dual layer structure in which a soft underlayer is provided as a lower layer. To increase the track density, it is necessary to provide the magnetic head with a finer and higher-accurate track width.

Further, since the magnetic disc drive provides a skew angle adapted to access the inner circumference and outer circumference of a disc, a problem arises of side writing depending on the shape of a main magnetic pole particularly in the perpendicular recording. To eliminate this problem, it is necessary that the width of the track width direction of the main magnetic pole is wider on the trailing side and narrower on the magnetic head substrate side, that is, has an inverted trapezoidal shape with respect to the substrate direction. For example, Patent Document 1 (JP-A No. 2003-263705) discloses an example of a magnetic head for use in perpendicular recording in which the lateral surface of the main magnetic pole is formed, by ion milling, into an inverted tapered shape by etching the main pole formed by a frame plating method. Patent Document 2 (JP-A No. 2004-95006) discloses a method of manufacturing a magnetic head for use in perpendicular recording, in which the surface of a substrate is obliquely irradiated with ion beams by using, as a mask, a non-magnetic metal film comprising Ta, W, Ti or an alloy thereof in order to form a write pole in an inverted trapezoidal shape.

BRIEF SUMMARY OF THE INVENTION

As described above, the main magnetic pole desirably has the width of the track width direction of the main magnetic pole, wider on the trailing side and narrower on the side of the magnetic head substrate, that is, an inverted trapezoidal shape with respect to the direction of the substrate. In this case, while an ion milling method is used for attaining the inverted trapezoidal shape, long milling time poses a problem of variations of the inverted trapezoidal shape and variations of the track width due to dimensional shift.

The increasing recording density in recent years has required a narrow track width of 150 nm or less. While the method described in Patent Document 1 prepares the inverted trapezoidal shape by a plating method, no sufficient consideration is made on the dimensional variations of the track width, etc. upon preparation of the inverted trapezoidal shape for the narrow track width. The method described in Patent Document 2 involves obliquely irradiating the surface of a substrate with ion beams by using, as a mask, a non-magnetic metal film having an etching rate relative to the ion beam smaller than the etching rate of a magnetic layer constituting a main magnetic pole. However, since a non-magnetic metal film such as alumina is present as a gap material below the main magnetic pole, the method involves a drawback in which the portion below the main magnetic pole is hard to scrape, making it difficult to form the inverted trapezoidal shape.

A feature of the present invention is to provide a method of manufacturing a magnetic head, capable of forming a main magnetic pole of an inverted trapezoidal shape by ion milling in a short period of time.

The invention further intends to provide a magnetic head with less dimensional scattering for the track width while maintaining the inverted trapezoidal shape of the main magnetic pole.

A method of manufacturing a magnetic head according to an aspect of the present invention comprises: forming a read head on a substrate; forming a lower magnetic pole on the reading head; forming a gap layer and conductor coils on the lower magnetic pole; forming an underlayer film of a material having a milling rate higher than that of a magnetic layer formed thereon above the gap layer and the conductor coils; forming by sputtering a magnetic layer magnetically coupled with the lower magnetic pole over the underlayer on the side opposite to a medium-opposing surface; and etching the magnetic layer by ion milling, thereby forming a main magnetic pole with the medium-opposing surface being in an inverted trapezoidal shape.

In some embodiments, the medium-opposing surface of the main magnetic pole has a width in the direction of track width, the width being narrowed in the direction of the substrate. The angle of the inverted trapezoid of the main magnetic pole is about 8 to 11° relative to a direction perpendicular to the surface of the substrate. A throat height of the main magnetic pole is preferably 300 nm or less. The underlayer film comprises a non-magnetic material. The underlayer film is preferably a non-magnetic metal comprising a material selected from the group consisting of Rh, Ru, Cu, Cr, and Au or an alloy thereof. The underlayer film may also be an insulative material such as Sic or $SiO_2$. The thickness of the underlayer film is preferably from about 1 to 50 nm. The underlayer film is preferably formed on an upper magnetic yoke and an inorganic insulative layer after the upper magnetic yoke is formed above the gap layer and the conductor coils at a position recessed from the medium-opposing surface and the inorganic insulative layer is formed on the upper magnetic yoke on a side of the medium-opposing surface. The magnetic layer is preferably formed by stacking a plurality of thin magnetic films.

In specific embodiments, the main magnetic pole is formed by forming an inorganic insulative layer over the magnetic layer, forming a mask on the inorganic insulative film, then applying ion milling at an angle of about 35° in the direction perpendicular to the surface of the magnetic layer for about 50 min, and then applying an ion milling at an angle of about 75° for 5 to 10 min. The reading head is formed by forming a lower magnetic shield layer above the substrate, forming a magnetoresistive device above the lower magnetic shield layer by way of a lower gap layer, and forming an upper magnetic shield layer over the magnetoresistive device by way of an upper gap layer.

A magnetic head according to another aspect of the invention comprises: a read head formed above a substrate; a lower magnetic pole formed above the read head; a gap layer and conductor coils formed above the lower magnetic pole; an underlayer film formed over the gap layer and the conductor coils and comprising a material selected from the group consisting of Rh, Ru, Cu, Cr, and Au, or an alloy thereof, or SiC or $SiO_2$; and a main magnetic pole magnetically coupled with the lower magnetic pole over the underlayer film on the side opposite to the medium-opposing surface in which a plurality of thin magnetic films having an inverted trapezoidal shape on a side of the medium-opposing surface are stacked.

In some embodiments, an angle of the inversed trapezoid of the main magnetic pole is about 8 to 11° relative to a direction perpendicular to the surface of the substrate. The underlayer film is formed over an upper magnetic yoke formed above the gap layer and the conductor coils at a position recessed from the medium opposed surface and an insulative layer formed on the upper magnetic yoke on a side of the medium-opposing surface, and the main magnetic pole is magnetically coupled with the upper magnetic yoke. The reading head comprises a lower magnetic shield layer formed over the substrate, a magnetoresistive device formed over the lower shield layer by way of a lower gap layer and an upper magnetic shield layer formed over the magnetoresistive device by way of an upper gap layer.

According to the present invention, a main magnetic pole of an inverted trapezoidal shape can be formed by ion milling in a short period of time.

Further, according to the invention, it is possible to provide a magnetic head with less dimensional variations in track width while maintaining the inverted trapezoidal shape of the main magnetic pole.

DETAILED DESCRIPTION OF THE INVENTION

Figure 7:
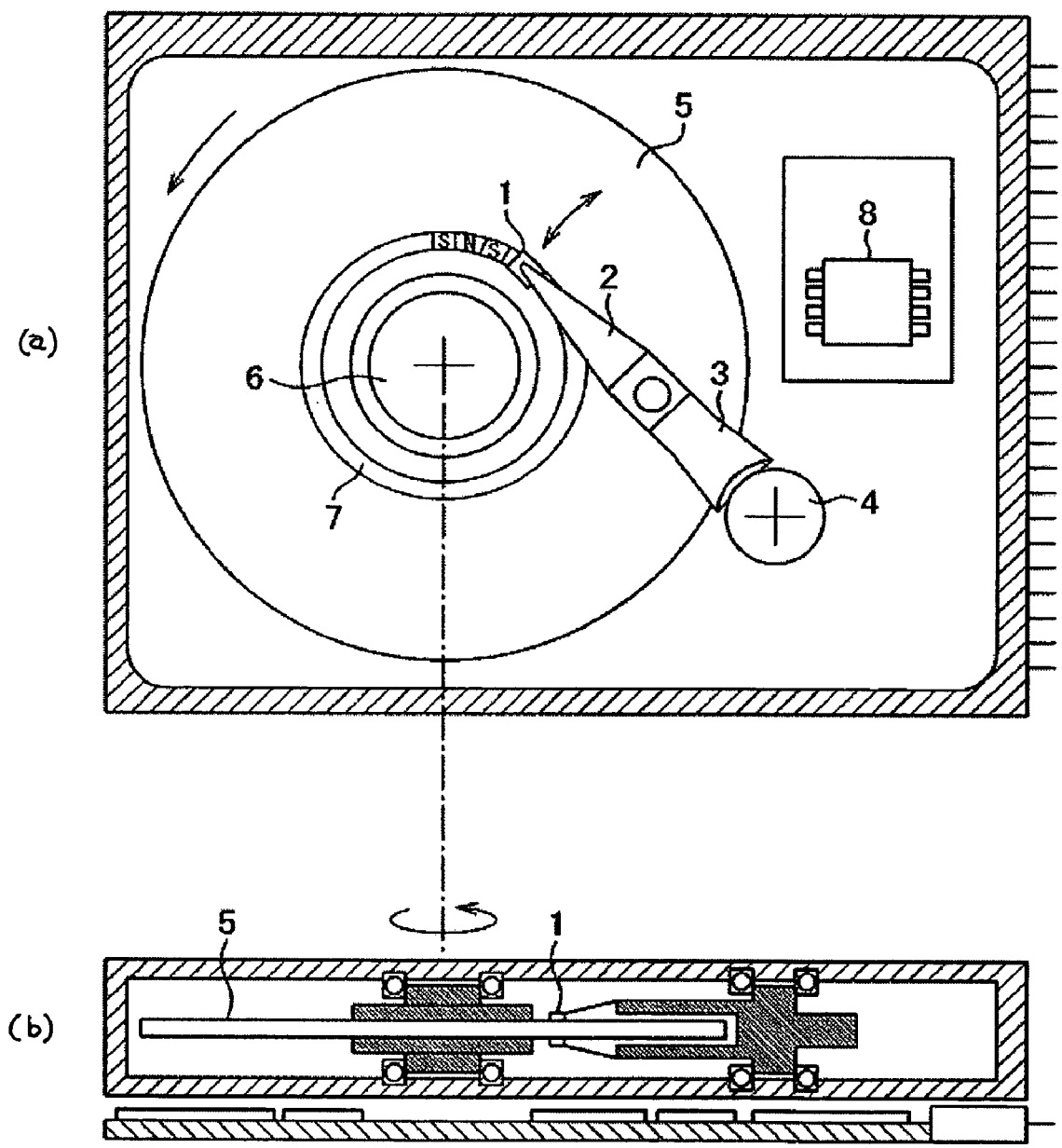
FIG. 7 is a schematic constitutional view of a magnetic disk drive on which a magnetic head of the embodiment is mounted.

Embodiments of the present invention will be described in detail with reference to the drawings. In the drawings, like constituent portions or functional portions carry the same reference numerals for easy understanding. FIG. 7 is a schematic constitutional view of a magnetic disk drive on which a magnetic head for perpendicular recording (hereinafter simply referred to as a magnetic head) according to an embodiment is mounted. FIG. 7A shows a plan view with a cover detached and FIG. 7B is a cross sectional view of a spindle motor and an actuator. The magnetic disk drive records and reproduces magnetization signals by a magnetic head 1 fixed to the top end of a suspension 2 on a magnetic disk 5 rotationally driven by a spindle motor 6. The suspension 2 is attached to an arm 3, and the arm 3 is supported by the actuator 4. The magnetic head is driven in the radial direction of the disk by the actuator 4 and positioned over a track 7 for read and write. Write signals supplied to the magnetic head 1 and read signals delivered from the magnetic head 1 are processed by a signal processing circuit 8.

Figure 8:
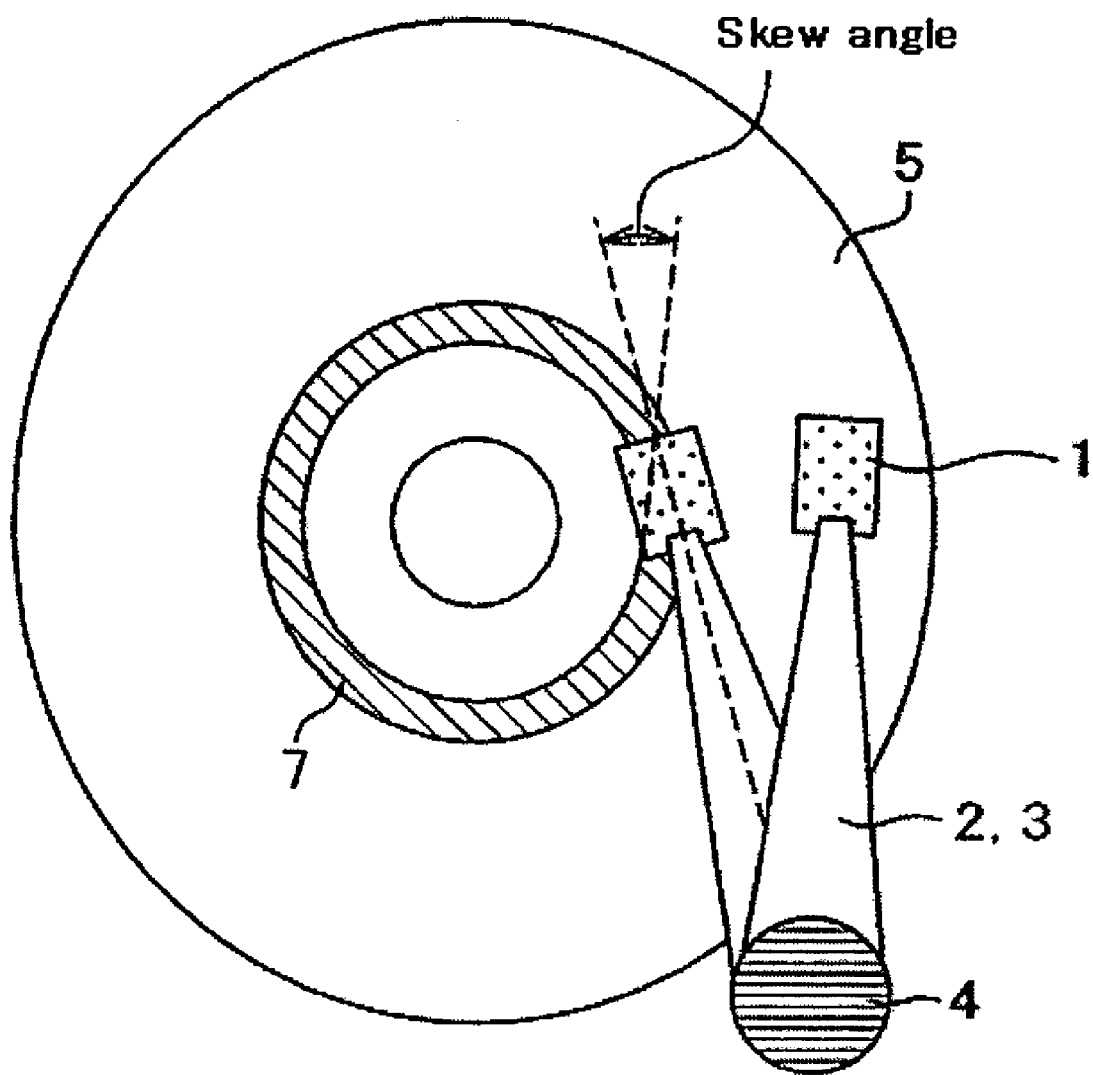
FIG. 8 is a view showing a skew angle of the magnetic head relative to the track.

FIG. 8 shows a schematic view of the magnetic head 1 driven in the radial direction of the magnetic disk 5. The actuator 4 is of a rotary type. As shown in the figure, a skew angle is formed at the inner circumference position and outer circumferential position of the magnetic disk 5. The skew angle is an angle formed between a line passing the center of the magnetic head 1 and the tangential direction of the track 7 of the magnetic disk 5. The skew angle ranges between about ±20°.

Figure 9:
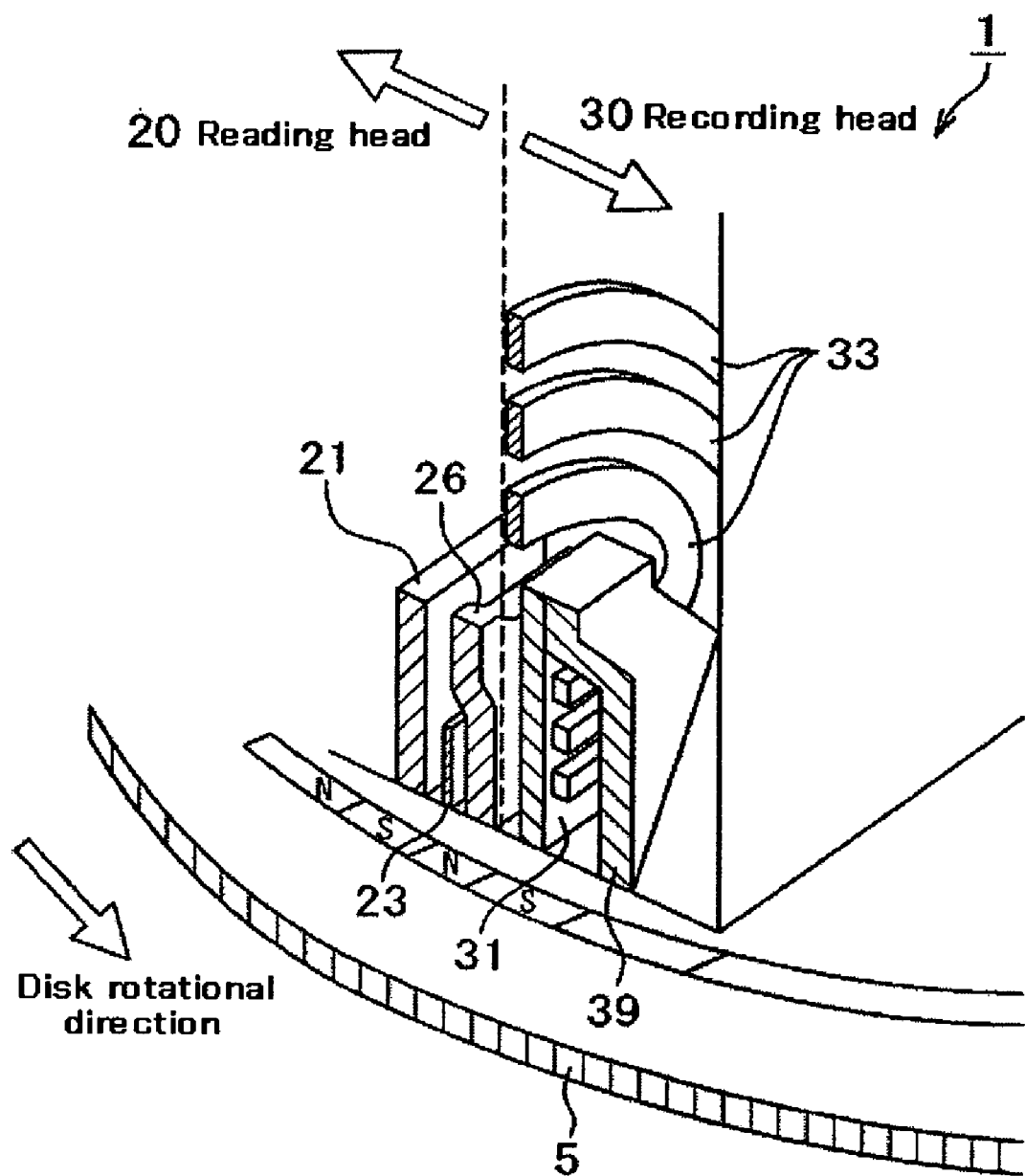
FIG. 9 is a view illustrating the relationship between a magnetic head for perpendicular recording and a magnetic disk.
Figure 10:
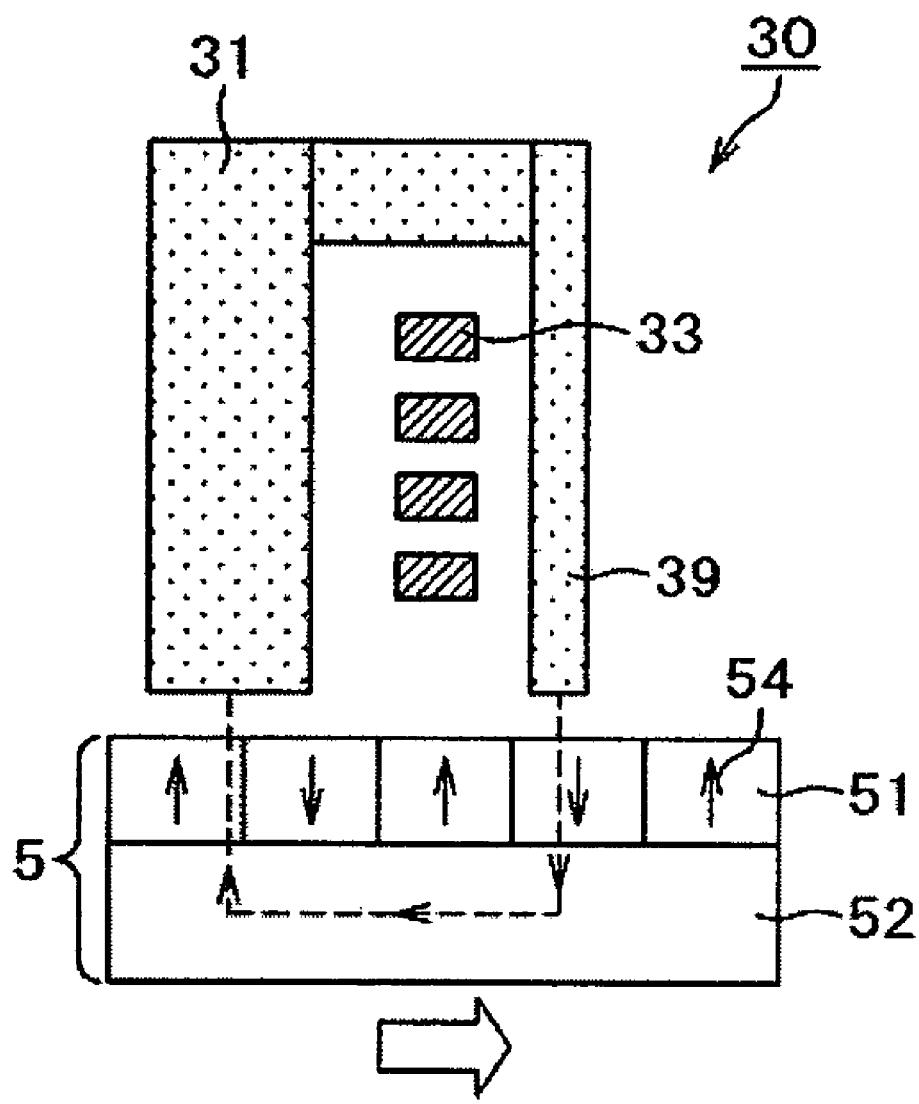
FIG. 10 is a view illustrating the principle of perpendicular recording.

FIG. 9 shows the relationship between the magnetic head 1 to which the manufacturing method of the embodiment is applied and the magnetic disk 5. The magnetic head 1 is depicted in an enlarged scale. FIG. 10 shows the principle of perpendicular magnetic recording. The magnetic head 1 comprises a write head 30 and a read head 20. The write head 30 is a head generating magnetic fields for writing data on a magnetic recording layer 51 of a magnetic disk 5. The write head 30 is a single magnetic pole head comprising a main magnetic pole 39, a lower magnetic pole (auxiliary magnetic pole) 31 and conductor coils 33 crossing a magnetic circuit formed by the main magnetic pole 39 and the lower magnetic pole 31. The read head 20 is a head for reading data written to the magnetic recording layer 51 of the magnetic disk 5. The read head 20 comprises a magnetoresistive device 23 such as a GMR device put between a pair of lower magnetic shield layer 21 and an upper magnetic shield 26. Magnetic fields from the main magnetic pole 39 of the recording head 30 form a magnetic circuit passing through a magnetic recording layer 51 and a soft magnetic backing layer 52 of the magnetic disk 5 and entering the auxiliary electrode 31 to record a magnetization pattern 54 to the magnetic recording layer 51. In this case, in view of the relation with the rotational direction of the disk, the shape of a portion where the main magnetic pole 39 finally leaves a point of the magnetic disk 5, that is, the shape of the upper surface (trailing side) and the lateral surface of the main magnetic pole 39 gives a significant effect on the shape of the magnetization pattern 54.

Figure 2A:
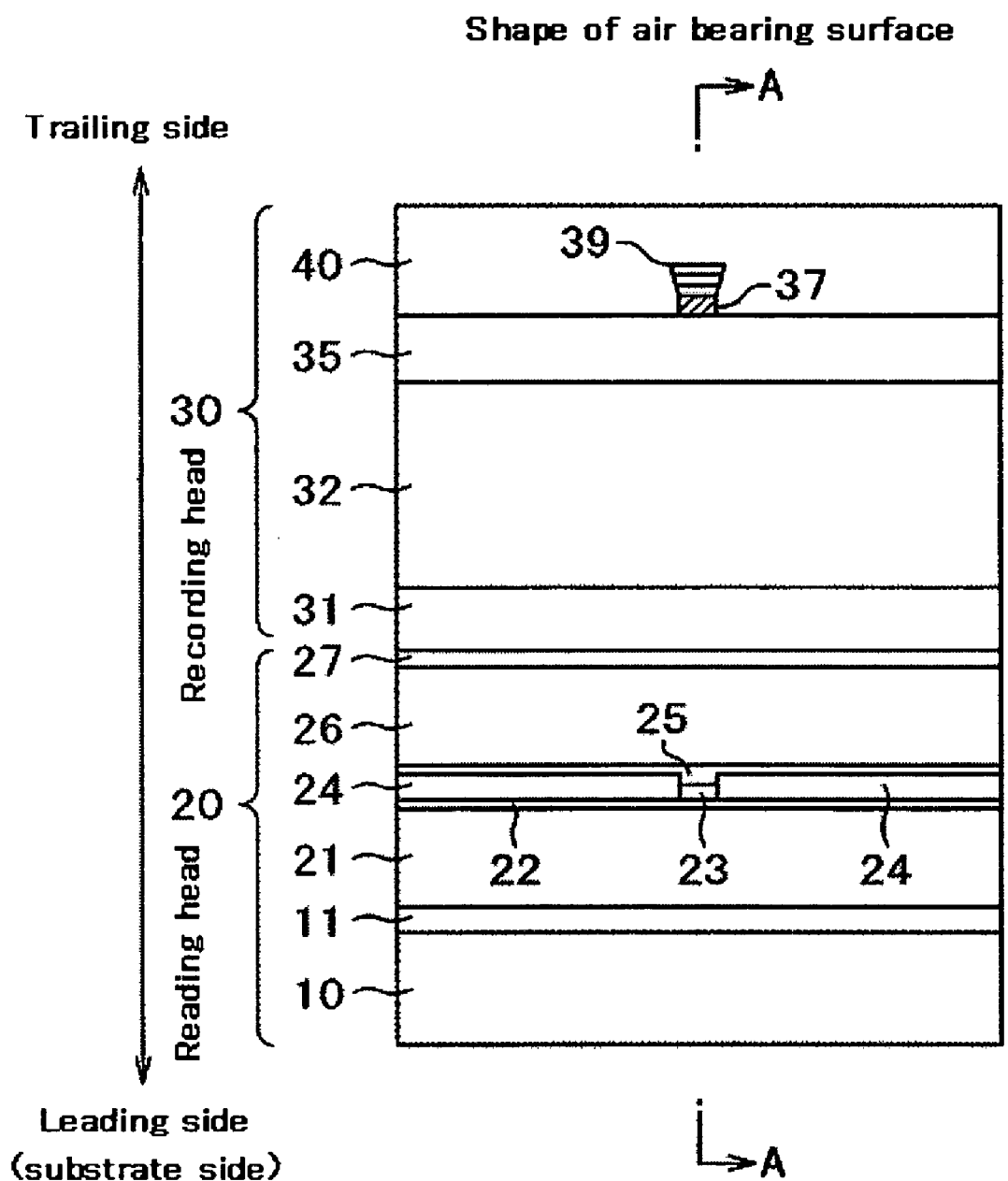
FIG. 2A is a view showing the shape of a magnetic head according to the embodiment as view from the side of the air bearing surface.
Figure 2B:
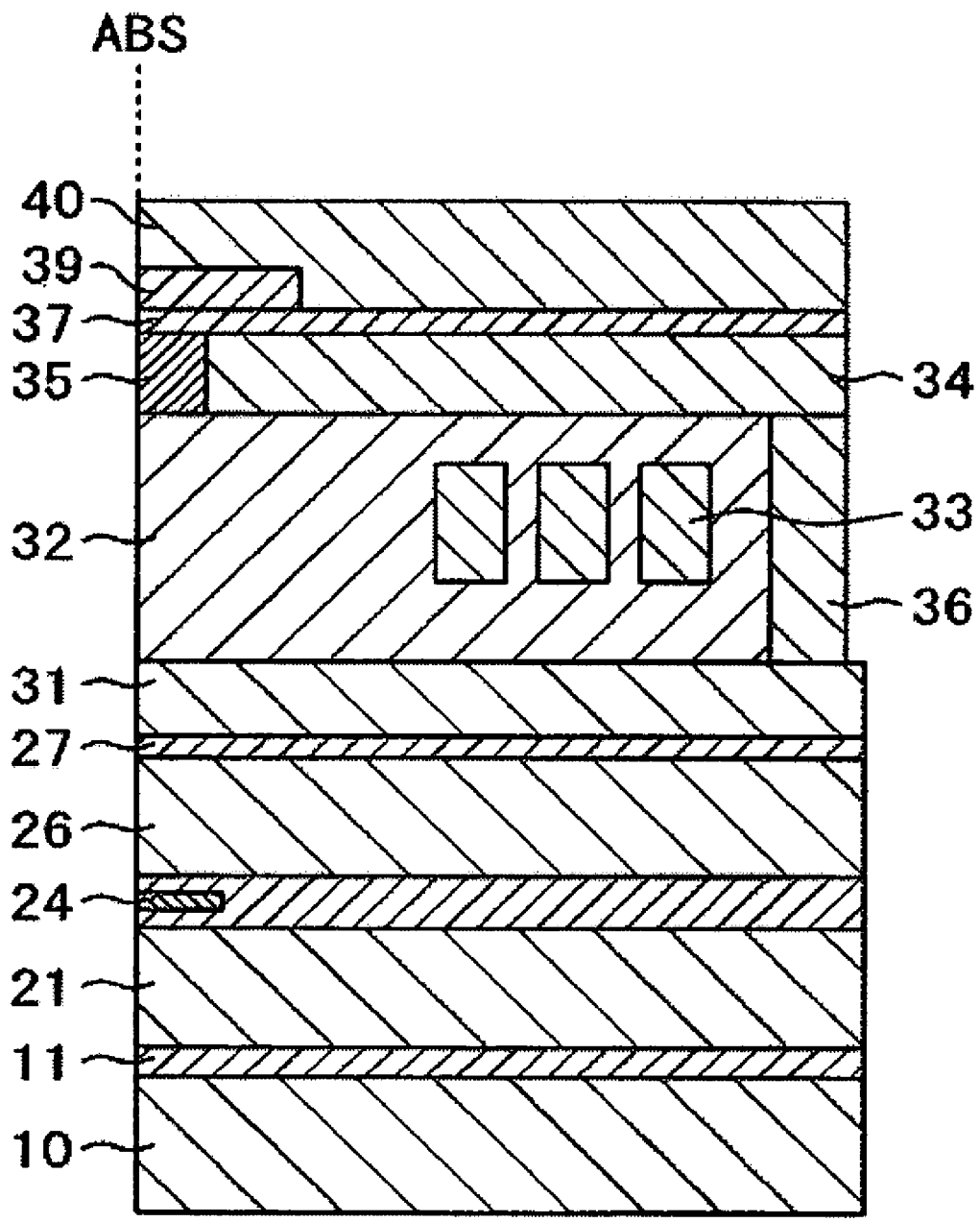
FIG. 2B is a cross sectional view taken along line A-A in FIG. 2A.

A manufacturing method and a constitution of the magnetic head 1 of the embodiment will be described with reference to FIGS. 2A and 2B. FIG. 2A is a view showing a shape of the magnetic head 1 as viewed from the side of the air bearing surface (the side of the medium opposing surface) and FIG. 2B is a cross sectional view taken along line A-A in FIG. 2A. The reading head 20 is fabricated through the following processes: At first a substrate 10 comprising ceramics such as $Al_2O_3$—TiC, etc. is provided and, after formation of an insulative layer 11 on the substrate 10, a lower magnetic shield layer 21 is formed. A lower gap layer 22 comprising alumina or the like is formed on the lower magnetic shield layer 21, and a magnetoresistive device 23 (herein after referred to as MR device) is formed on the lower gap layer 22. Preferable examples used as the MR device 23 include a giant magnetoresistive (GMR) device, a tunnel type magnetoresistive (TMR) device of a further higher reading output, and a CPP type GMR device for carrying a current perpendicular to the film surface. A pair of electrodes 24 for deriving the change of resistance as electric signals are formed on both ends of the MR device 23, and an upper gap layer 25 comprising alumina or the like is formed over the MR device 23 and the electrodes 24. An upper magnetic shield 26 is formed on the upper gap layer 25.

The recording head 30 is fabricated through the following processes: An upper magnetic shield insulative layer 27 comprising alumina or the like is at first formed on the upper magnetic shield layer 26 of the reading head 20, a lower magnetic pole 31 is formed on the upper magnetic shield insulative layer 27, a gap layer 32 comprising alumina or the like is formed on the lower magnetic pole 31, and conductor coils 33 are formed in the gap layer 32. The conductor coils 33 may also be formed in an interlayer insulative layer comprising an organic insulator separately from the gap layer 32. An upper magnetic yoke 34 is formed on the gap layer 32 at a position recessed from the air bearing surface and an inorganic insulative layer 35 such as of alumina or the like is formed in the recessed portion. A back magnetic pole 36 connected with the back portion of the upper magnetic yoke 34 to constitute a magnetic circuit is formed at the back of the lower magnetic pole 31. Successively, the upper surfaces of the inorganic insulative layer 35 and the upper magnetic yoke 34 is planarized by CMP or the like, over which a nonmagnetic metal layer (underlayer film) 37 comprising Rh, Ru, Cu, Au, Cr, or an alloy thereof is formed. A magnetic layer as a main magnetic pole 39 is formed by stacking a plurality of thin magnetic films by sputtering over the underlayer film 37 from the air bearing surface to a position overlapping the upper magnetic yoke 34. Successively, etching is conducted by ion milling to form a main magnetic pole 39 in an inverted trapezoidal shape having a taper on the lateral surface as viewed from the air bearing surface. Successively, a hard protective layer 40 comprising alumina or the like is formed so illustrated) for supplying a current to the conductor coils 33 and a read terminal (not illustrated) for transmitting a signal current from the electrode 24 to the outside are formed.

The underlayer film 37 is selectively made of a material having a milling rate higher than that of the magnetic layer constituting the main magnetic pole 39. The inverted trapezoidal shape of the main magnetic pole 39 may be such that a taper terminates at the lowermost portion of the main magnetic pole 39 or that a taper extends to the midway of the main magnetic pole 39 and is formed into the straight extending therefrom to the lowermost portion.

As described above, the underlayer film 37 is formed before the magnetic layer constituting the main magnetic pole 39 is formed by a sputtering method. In addition, the underlayer film 37 is made of a nonmagnetic metal higher in milling rate than the magnetic layer. This enables the main magnetic pole 39 to be formed into the trapezoidal shape in a shorter period of time as compared with a case of not forming the underlayer film having a higher milling rate. Accordingly, this decreases the dimensional variations in track width, which stabilizes the write performance of the head. Further, the tapered structure in which the film thickness of the main magnetic pole 39 is reduced from above in the direction of the height of the device toward the substrate 10 can improve the recording magnetic field strength by about 30% compared with the case of not forming the tapered structure.

Figure 3:
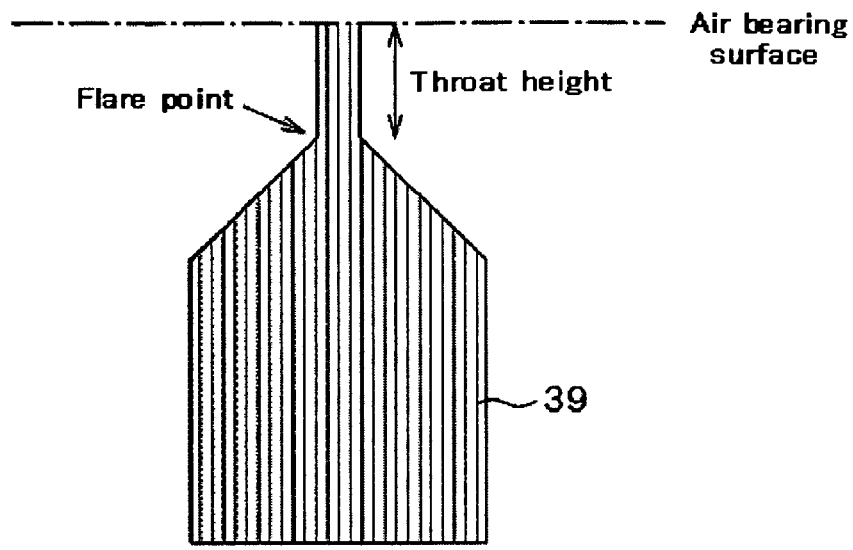
FIG. 3 is a view showing the relationship between recording magnetic field strength and throat height.
Figure 4:
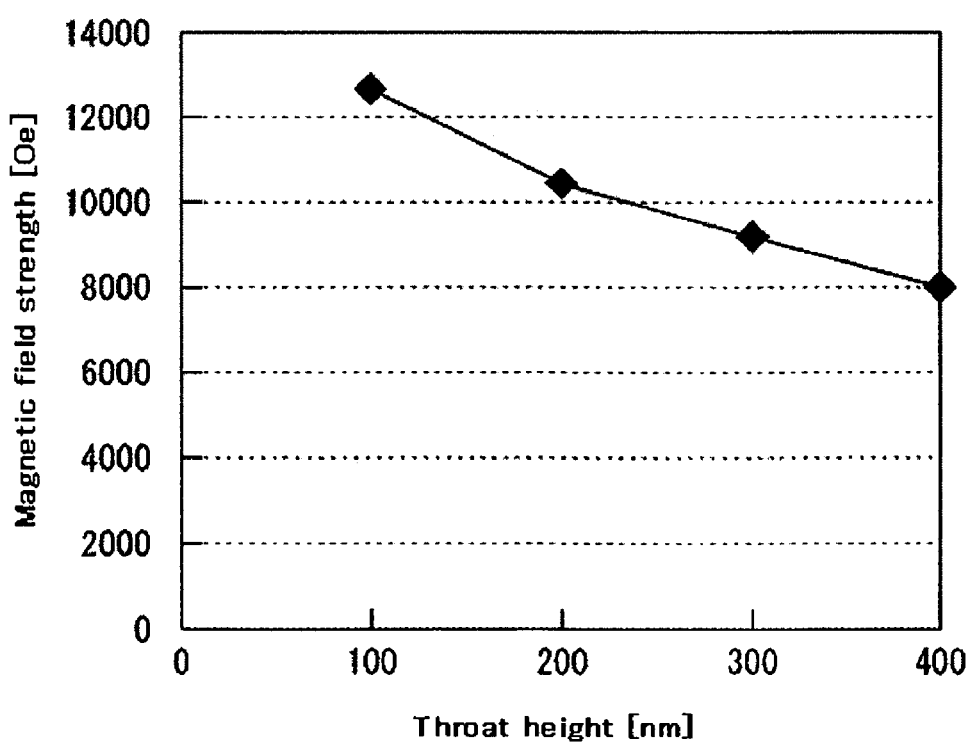
FIG. 4 is an upper plane view of a main magnetic pole of a write head.

Then, the constitution and manufacturing conditions required for the main magnetic pole 39 of the recording head 30 will be described. FIG. 3 shows the main magnetic pole 39 as viewed from its upper surface. The length of a section of the main magnetic pole 39 extending from the air bearing surface where the magnetic head flies above the magnetic desk to a position where the width of the track portion is widened (referred to as a flare point) is defined as a throat height. FIG. 4 shows the relationship between the recording magnetic strength and the throat height. Since the recording magnetic strength decreases along with an increase of the throat height, it is desirable that the throat height be about 300 nm or less.

Figure 5:
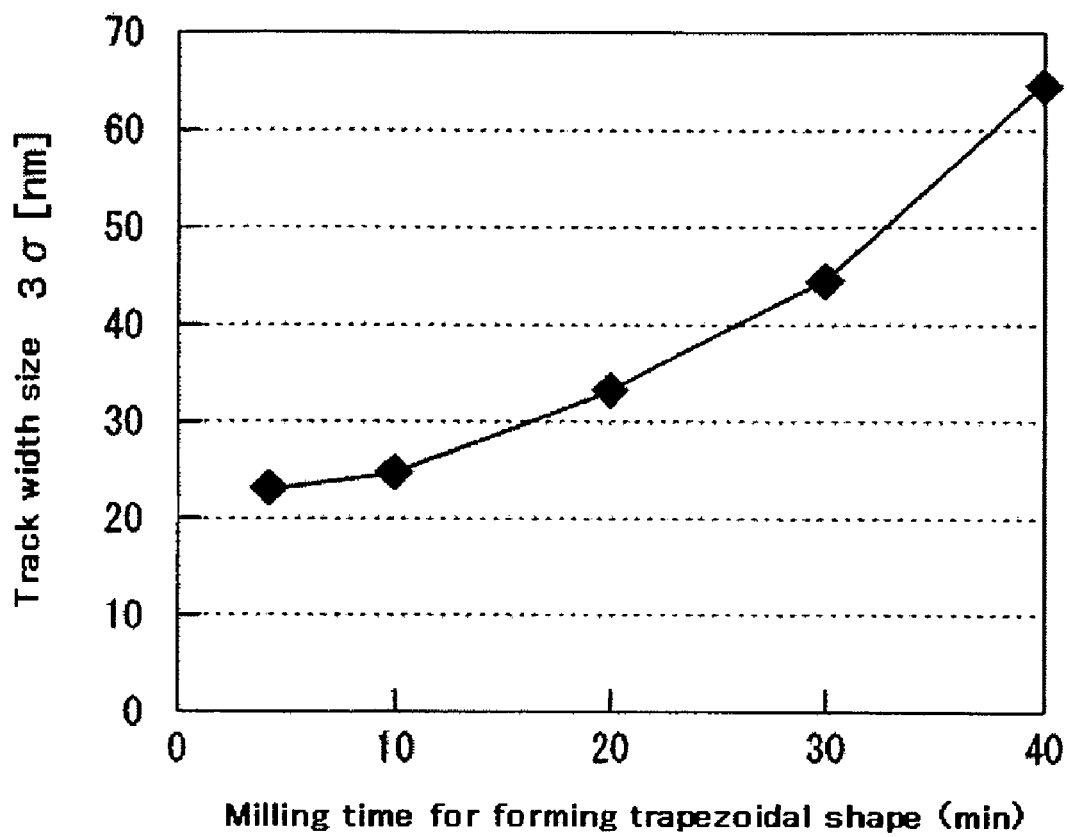
FIG. 5 is a view showing the relationship between ion milling time and dimensional accuracy of a track width.
Figure 6:
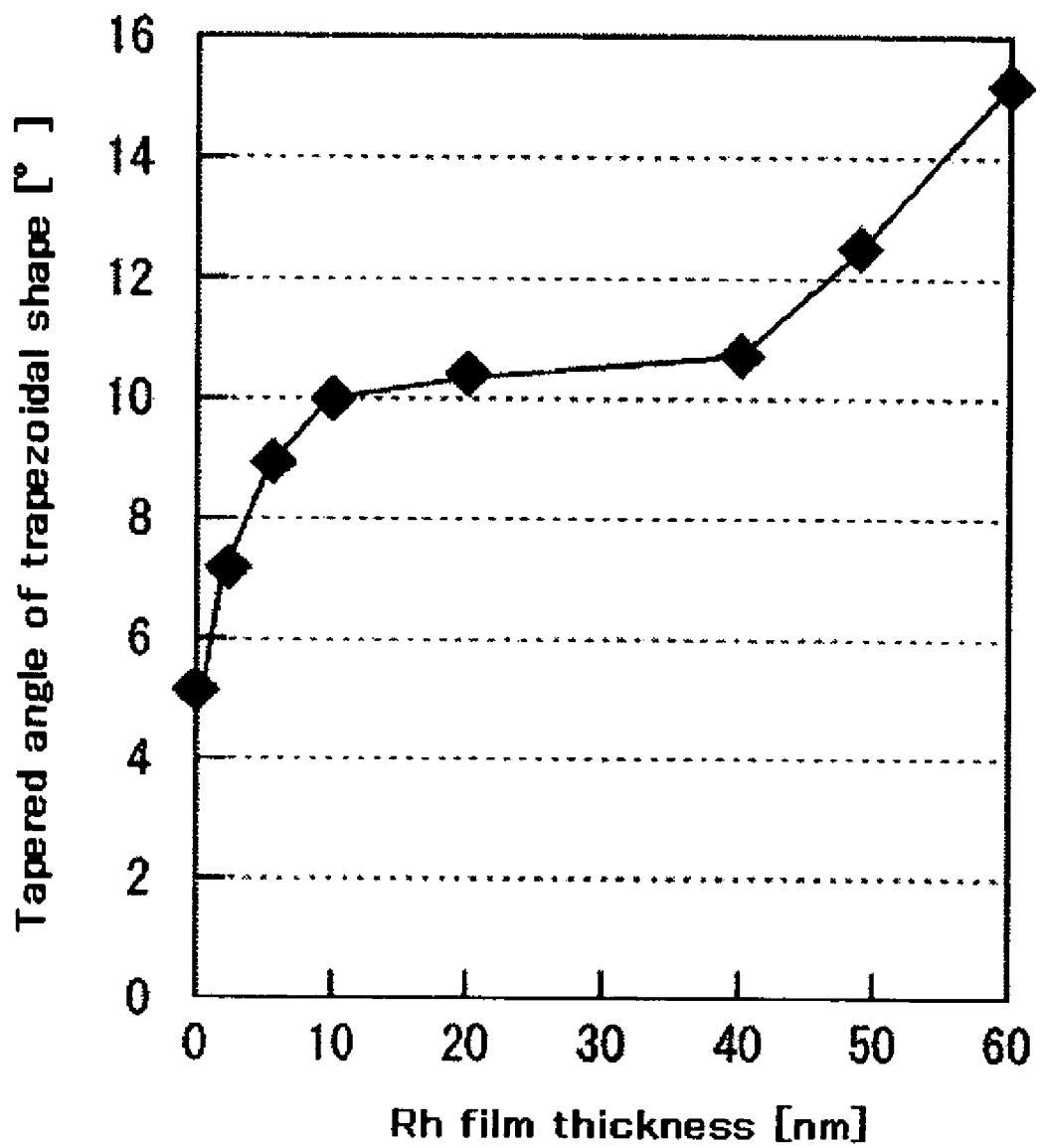
FIG. 6 is a view showing a relation between the film thickness of an underlayer Rh and the tapered angle of the trapezoidal shape of a main magnetic pole.

Further, as shown in FIG. 8, since the skew angle is formed for the magnetic head 1 in the magnetic disk drive using the rotary type actuator, it is necessary to form the shape of the air bearing surface of the main magnetic pole included in the recording head 30, into the inverted trapezoidal shape. In the method of forming the main magnetic pole into the inverted trapezoidal shape, the main magnetic pole is etched by the ion milling method into a desired shape as described above. In a case where the milling period is long, however, the dimensional variations in track width increase as shown in FIG. 5. Accordingly, the embodiment described above adopts a method of forming the underlayer film comprising the material having a higher milling rate than that of the main magnetic pole before formation of the main magnetic pole by a sputtering method thereby shortening the milling period for forming the inverted trapezoidal shape. FIG. 6 shows the relationship between the thicknesses of the underlayer film and the tapered angles of the inverted trapezoidal shape of the substrate for the same milling time of 10 min, the underlayer film being made of a material Rh with a higher milling rate that is formed before formation of the main magnetic pole by a sputtering method. The tapered angle is an angle from the direction perpendicular to the surface of the substrate 10. As can be seen from FIG. 6, in view of providing the taper angle, an effect is provided with a film thickness of Rh of 1 nm or more and it is preferred that the film thickness of Rh be 5 nm or more. Further, as the film thickness of Rh increases to 50 nm or more, the lower portion of the main magnetic pole is extremely narrowed, that is, can no more be formed as the inverted trapezoidal shape.

Figure 1A:
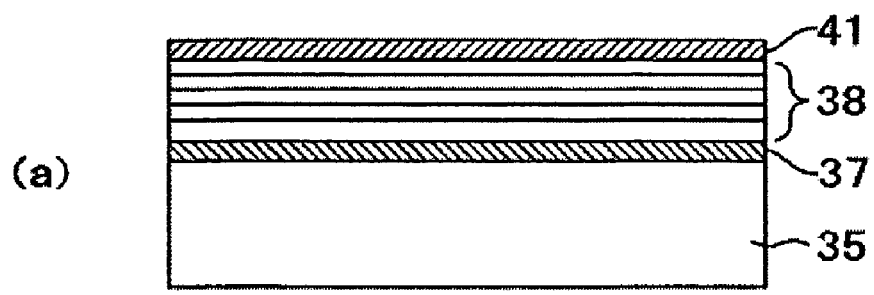
FIG. 1A is a step chart showing a method of forming the main magnetic pole of a recording head according to an embodiment of the invention.
Figure 1A:
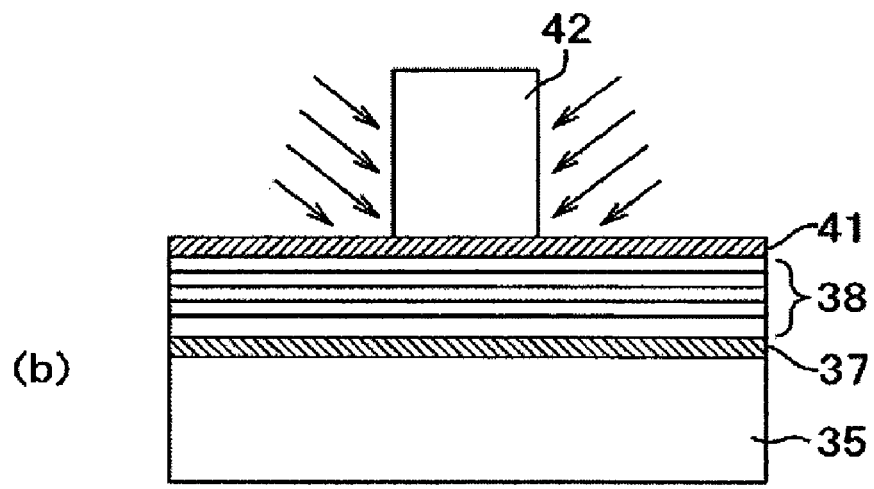
Figure 1A:
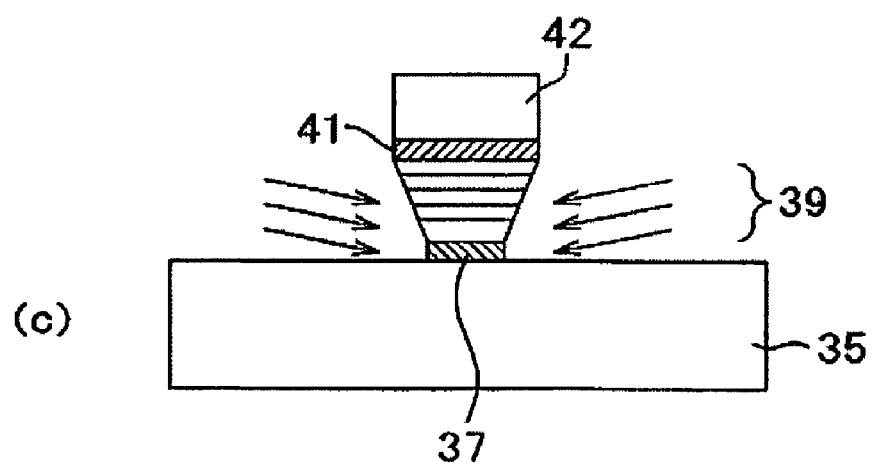
Figure 1B:
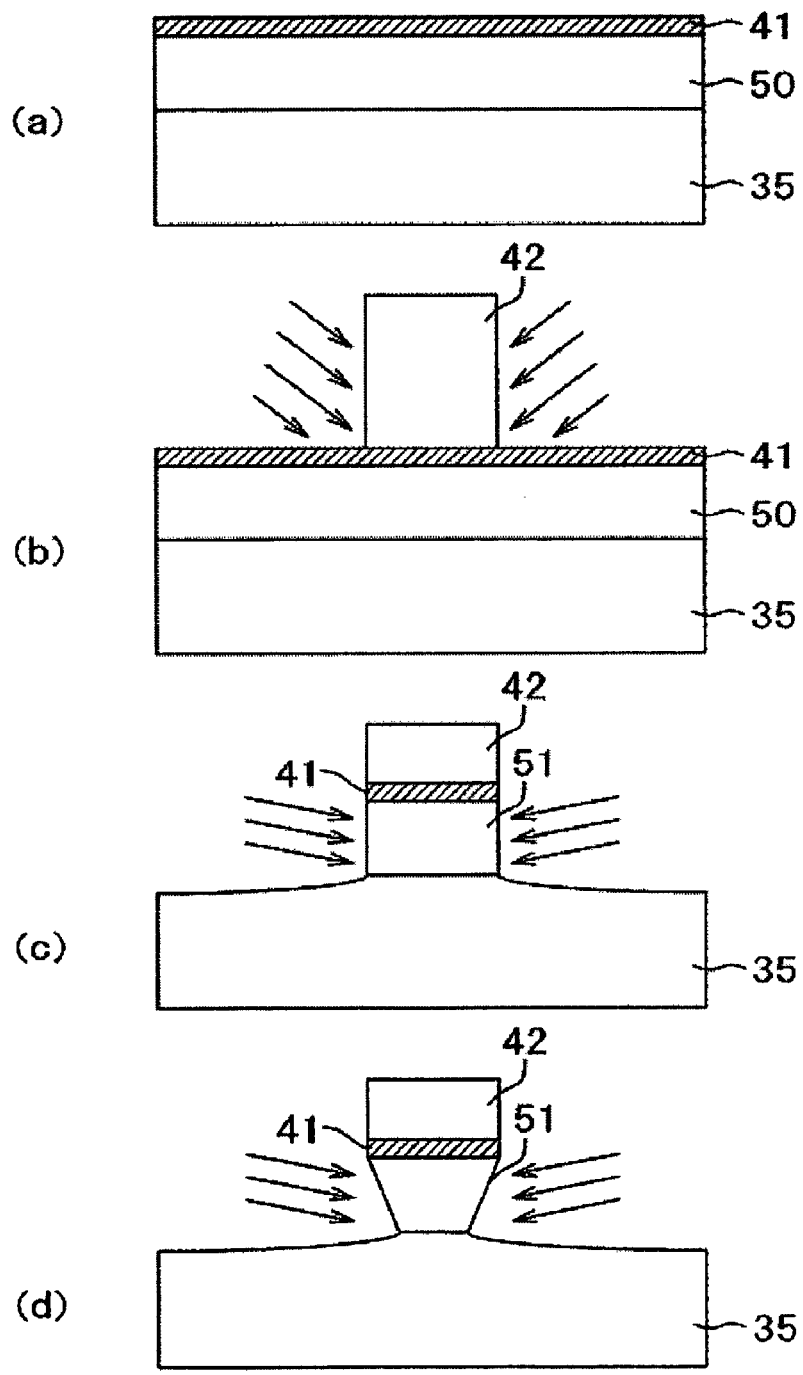
FIG. 1B is a step chart showing the method of forming a main magnetic pole in a comparative example.

The method of forming the main magnetic pole 39 is to be described in comparison with a comparative example with reference to FIGS. 1A and 1B. In the comparative example, as shown in FIG. 1B(a), a single magnetic layer 50 is formed on an inorganic insulative layer 35, on which an inorganic insulative layer 41 such as of alumina is formed. On the other hand, in this embodiment, as shown FIG. 1A(a), an underlayer film 37 made of Rh is deposited to about 20 nm on an inorganic insulative layer 35, on which a plurality of thin magnetic films are stacked by sputtering to form a magnetic layer 38 and, an inorganic insulative layer 41 such as of alumina is formed further thereon. Successively, as shown in FIGS. 1A(b) and 1B(b), a mask material 42 comprising a resist or the like is formed for determining the width (track width) on the trailing side of the main magnetic pole, and ion milling is applied at an angle of about 35° for about 50 min, then the magnetic layers 38, 50 being each cut into a notched shape. Successively, in the embodiment, as shown in FIG. 1A(c), the main magnetic pole 39 is formed into the inverted trapezoidal shape at the stage of applying ion milling at an angle of about 75° for 5 to 10 min. In the comparative example, as shown in FIG. 1B(c), the main magnetic pole 1 is formed into a rectangular shape at the stage where ion milling is applied at an angle of about 75° for about 30 min and then into the inverted trapezoidal shape as shown in FIG. 1B(d) by applying ion milling for further 20 min.

In the embodiment described above, the underlayer film 37 of the material having a higher milling rate than that of the magnetic layer 38 is formed before formation of the magnetic layer 38. Therefore, the etching rate for the lower portion is higher than that for the upper portion of the main magnetic pole 39 and the main magnetic pole 39 can be formed into the inverted trapezoidal shape in the ion milling time of as short as 55 to 60 min. As compared with the aimed tapered angle of 7 to 13° in the inverted trapezoid, this embodiment can result in an angle of 8 to 11°, that is, the aimed dimension can be satisfied. While the aimed track width is 120 nm and the accuracy for the track width is 28 nm relative to 30 nm or less for the aimed 3σ, the aim can be satisfied. The inverted trapezoid may have such a shape that a taper extends to the lowermost portion of the main magnetic pole 39 as shown in FIG. 1A(c), or that the taper terminates at the midway of the main magnetic pole 39 and is formed into a straight extending therefrom to the lowermost portion. That is, the purpose can be attained while the lowermost position of the taper is optional.

On the contrary, in the comparative example, the ion milling time requires 100 min and the inverted trapezoidal tapered angle is about 8 to 12° which satisfies the aimed dimension. However, the accuracy for the track width is 42 nm relative to 30 nm or less at the aimed 3σ, which is degraded about by 50% compared with this embodiment, and does not reach the aimed value.

While Rh is used as a material disposed below the main magnetic pole 39, a non-magnetic metal such as Ru, Cu, Au, Cr, etc., or an alloy thereof, or an insulator such as SiC or $SiO_2$ can also be used. Further, to suppress the demagnetization effect, while the magnetic layer 38 is formed by stacking a plurality of thin magnetic films, it may be a single layer so long as demagnetization gives no significant problem.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of manufacturing a magnetic head comprising:
    forming a read head above a substrate,
    forming a lower magnetic pole above the read head;
    forming a gap layer and conductor coil above the lower magnetic pole;
    forming an underlayer film on an insulative layer and a magnetic yoke formed above the gap layer and the conductor coil;
    forming by sputtering above the underlayer, a magnetic layer magnetically coupled with the lower magnetic pole through an opposite side to a medium-opposing surface; and
    etching the magnetic layer by ion milling, to form a main magnetic pole with the medium-opposing surface having an inverted trapezoidal shape,
    wherein the underlayer film is made from a material having a milling rate higher than the milling rate of the magnetic layer.

2. A method of manufacturing a magnetic head according to claim 1, wherein the medium-opposing surface of the main magnetic pole has a width in a direction of a track width, the width being narrowed in a direction of the substrate.

3. A method of manufacturing a magnetic head according to claim 1, wherein an angle of the inverted trapezoid of the main magnetic pole is about 8 to 11° relative to a direction perpendicular to the surface of the substrate.

4. A method of manufacturing a magnetic head according to claim 1, wherein a throat height of the main magnetic pole is about 300 nm or less.

5. A method of manufacturing a magnetic head according to claim 1, wherein the underlayer film comprises a non-magnetic material.

6. A method of manufacturing a magnetic head according to claim 1, wherein the underlayer film comprises a material selected from the group consisting of Rh, Ru, Cu, Cr, and Au or an alloy thereof.

7. A method of manufacturing a magnetic head according to claim 1, wherein the underlayer film comprises SiC or $SiO_2$.

8. A method of manufacturing a magnetic head according to claim 1, wherein the underlayer film has a thickness of about 1 to 50 nm.

9. A method of manufacturing a magnetic head according to claim 1, wherein the magnetic yoke is an upper magnetic yoke and the insulative layer is an inorganic insulative layer, and the underlayer film is formed after the upper magnetic yoke and is above the gap layer and the conductor coils, the upper magnetic yoke is at a position recessed from the medium-opposing surface, and the inorganic insulative layer is formed on the upper magnetic yoke on a side of the medium-opposing surface.

10. A method of manufacturing a magnetic head according to claim 1, wherein the magnetic layer is formed by stacking a plurality of thin magnetic films.

11. A method of manufacturing a magnetic head according to claim 1, wherein the main magnetic pole is formed by forming an inorganic insulative layer over the magnetic layer, forming a mask on the inorganic insulative film, then applying ion milling at an angle of about 35° in a direction perpendicular to the surface of the magnetic layer for about 50 mm, and then applying an ion milling at an angle about 75° for 5 to 10 mm.

12. A method of manufacturing a magnetic head according to claim 1, wherein the read head is formed by forming a lower magnetic shield layer above the substrate, forming a magnetoresistive device above the lower magnetic shield layer by way of a lower gap layer, and forming an upper magnetic shield layer over the magnetoresistive device by way of an upper gap layer.

* * * * *